United States Patent [19]
Gottfried et al.

[11] Patent Number: 5,450,961
[45] Date of Patent: Sep. 19, 1995

[54] REUSABLE MULTIPACK FOR STACKED WOUND ROLLS

[75] Inventors: Lutz Gottfried, Seefeld; José Toral, Munich; August Liepold, Munich; Hartmut Thiele, Munich, all of Germany

[73] Assignee: BASF Magnetics GmbH, Mannheim, Germany

[21] Appl. No.: 208,846

[22] Filed: Mar. 11, 1994

[30] Foreign Application Priority Data

Mar. 31, 1993 [DE] Germany ............... 9304895 U

[51] Int. Cl.⁶ .................. B65D 85/67; B65D 21/00
[52] U.S. Cl. .................... 206/394; 206/386; 206/408; 206/497; 206/499; 206/509
[58] Field of Search ............ 206/394, 391, 408, 303, 206/497, 499, 386, 509, 512

[56] References Cited

U.S. PATENT DOCUMENTS

| | | | |
|---|---|---|---|
| 2,594,287 | 4/1952 | Budd | 206/303 |
| 2,700,463 | 1/1955 | McCormick | 206/303 X |
| 3,640,049 | 2/1972 | Fritz et al. | 206/394 X |
| 3,685,646 | 8/1972 | Sy | 206/408 |
| 4,081,151 | 3/1978 | Ender et al. | 206/394 X |
| 4,120,398 | 10/1978 | Braddon, Sr. | 206/408 |
| 4,491,222 | 1/1985 | Gaccetta et al. | 206/394 |
| 4,516,677 | 5/1985 | Rowland et al. | 206/394 |
| 4,708,246 | 11/1987 | Minion | 206/394 |
| 4,792,044 | 12/1988 | Nishizawa et al. | 206/394 |
| 4,919,270 | 4/1990 | Govang et al. | 206/497 X |
| 4,955,471 | 9/1990 | Hirose et al. | 206/303 |
| 4,988,001 | 1/1991 | Brandstetter et al. | 206/394 |
| 5,297,680 | 3/1994 | Butterfield et al. | 206/499 |

FOREIGN PATENT DOCUMENTS

| | | | |
|---|---|---|---|
| 3027804 | 2/1982 | Germany | 206/303 |
| 396689 | 7/1933 | United Kingdom | 206/394 |

*Primary Examiner*—Bryon P. Gehman
*Attorney, Agent, or Firm*—Keil & Weinkauf

[57] ABSTRACT

A description is given of a cuboidal multipack for vertically stacked magnetic recording media, comprising a rectangular pallet, a baseplate and top plate and wound roll sets stacked between two intermediate plates in each case, the tape rolls being wound up on flangeless winding hubs provided with internal bores, through which a hub sleeve is inserted, the pack being protected by edges and side parts and a stretch film being drawn around the entire unit. To be able to stack a large number of wound rolls one on top of the other without the risk of damaging the edges of the tape rolls, each intermediate plate, which is provided on its upper side and under side with a ring groove, is supported by means of the end face of the hollow-cylindrical hub sleeve by the next-lower intermediate plate, so that merely the wound pack accommodated in one set is placed with its weight able to bear on an intermediate plate. The intermediate plates may include on their outer edges projections and grooves assigned to them, so that they are able to be transported stacked one on top of the other on the same pallet in return shipment. It is assured by the material selection of the multipack that the entire pack part can be brought into a clean room without the risk of dust and can be taken off with little effort.

4 Claims, 5 Drawing Sheets

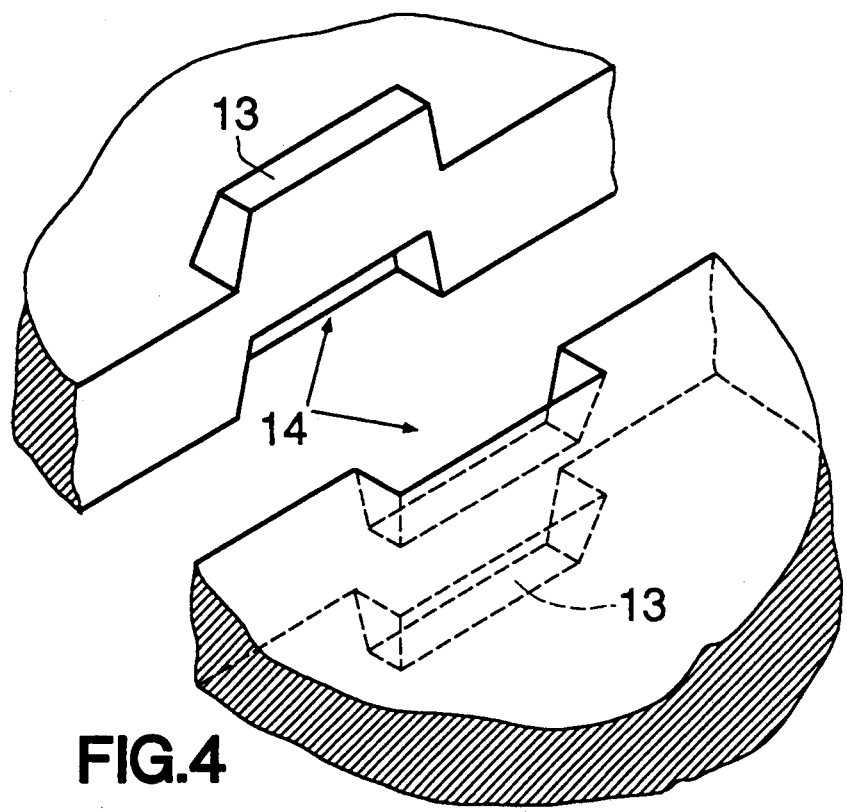
FIG.4
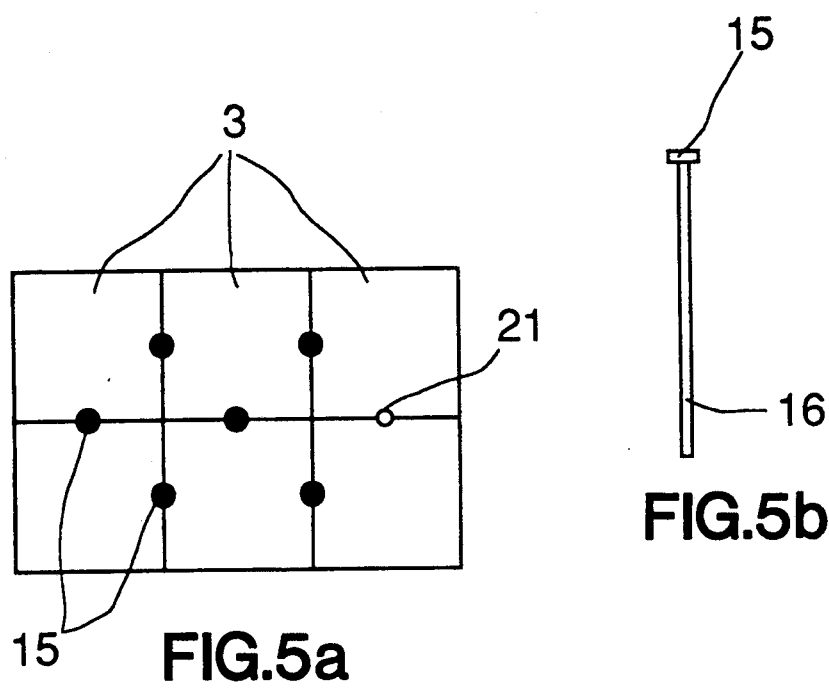
FIG.5a
FIG.5b

REUSABLE MULTIPACK FOR STACKED WOUND ROLLS

The innovation relates to a cuboidal multipack for vertically stacked wound rolls, comprising a rectangular pallet, a rectangular baseplate located on the latter and also a top plate which is substantially identical to said baseplate, with rectangular intermediate plates and also a multiplicity of wound rolls respectively stacked in between, with fixing means for the pack and the wound rolls, the wound rolls being recording media in tape form which are wound up on flangeless winding hubs provided with internal bores, through which a hub sleeve can be inserted and the lateral four corners of the pack being secured by vertically attached corner parts and there being a stretch film drawn around the side parts of the pack.

A multipack of the generic type mentioned at the beginning is known from German Utility Model 91 09 284. In the case of this multipack, a large number of wound rolls are stacked one on top of the other, the wound rolls being packed in two rows of three stacks each on a Europallet. Inserted through the internal bores is a winding sleeve, which extends continuously from the top plate to the baseplate and is fixed in the baseplate, the top plate and an intermediate plate identical to the latter. This design of pack has the disadvantage that a large number of wound rolls are stacked one on top of the other, making the weight considerable. Although thin intermediate layers are respectively inserted between two wound rolls and, moreover, a plurality of wound rolls stacked one on top of the other are spaced apart by flexible plastic inserts, it is not possible to exclude the possibility that, during the transportation of sensitive wound rolls, in particular of video magnetic tapes, the edges of the tapes are damaged by the great weight of one lying on top of the other.

German Utility Model 92 03 577 discloses a multipack for wound rolls which is of a similar construction to the multipack mentioned at the beginning, but the wound rolls are arranged in a row on a horizontal sleeve and are secured by fixing means. The end plates and the intermediate plate contain projections and grooves assigned to them, so that a plurality of the units described can be combined one on top of the other or one next to the other on a pallet for transportation.

DE 41 09 360 discloses a 1-part or multi-part cuboidal multipack container for wound rolls stacked one on top of the other, comprising a bottom part, a top part and side parts, which are connected to one another by means of molded-on film hinges and it being possible to push a hub support through the internal bores of the winding hubs. Here too, a plurality of such multipacks can be stacked one on top of the other for transportation in such a way that they do not slip by appropriate shaping of the bottom and top surfaces. This pack container, in which the parts consist of plastic and are shaped by the extrusion blow-molding technique, is currently being sold worldwide by the applicant under the name ECOSHUTTLE.

A further multipack is known from German Utility Model 91 04 918. It comprises an outer box-shaped supporting framework and a likewise box-shaped inner multi-container in which the wound rolls are arranged on a plurality of mandrels running horizontally parallel to one another, the latter being firmly anchored on the rear side of the multi-container and, for transportation of the ready-packed multipack, a front covering plate with fixing means being pushed through the free front ends of the mandrels. Furthermore, the multipack described includes devices for fixing the wound rolls.

The multipacks described above have in some cases the following disadvantages:
due to their composition, they are not suitable for production clean rooms
for internal transportation at the customer's premises, they require special transporting means
in some cases they are not of a standard size, for example they do not conform to the Europallet or USA pallet
they require special tools for unpacking due to the multiplicity of parts, problems with respect to scrap and return delivery arise
the parts are not easily cleanable or returnable.

It is therefore an object of the present innovation to find a multipack of the generic type mentioned at the beginning which does not have the disadvantages mentioned above and with which damage to the pack content is avoided with certainty in a particular way, in particular in the transportation of sensitive magnetic tapes.

We have found that this object is achieved according to the innovation by a cuboidal multipack for vertically stacked wound rolls, comprising a rectangular pallet (1), a rectangular baseplate (2) located on the latter and also a top plate (2') which is substantially identical to said baseplate, a multiplicity of rectangular intermediate plates (3), between which wound rolls (5) are stacked, the multipack including fixing means for the pack and the wound rolls, the wound rolls being recording media in tape form which are wound up onto flangeless winding hubs (5) provided within internal bores, through which a hub sleeve (6) is inserted and the lateral four edges of the pack being secured by vertically attached corner parts (9) and there being a stretch film (4) drawn around the side parts of the pack, wherein a set of wound rolls stacked one on top of the other is arranged in each case between two intermediate plates (3), the outside dimensions of which are somewhat greater than the diameter of the wound rolls (5), the height of the hub sleeve (6) being somewhat greater than the overall height of a wound set (5), the intermediate plate (3) having in its center on both sides a ring groove (7), into which the ends of the hub sleeve (6) enter and each intermediate plate being supported merely on the upper side of the hollow-cylindrical hub sleeve (6) respectively located underneath. Further details of the innovation emerge from the subclaims, the drawings, and the description.

The innovation is described in more detail below with reference to the drawings, in which FIG. 1 represents a perspective view of the multipack according to the innovation with wound roll units stacked one on top of the other.

FIG. 4 represents details of the edge configuration of the intermediate plates.

FIG. 5a represents a plan view of a further embodiment of the pack according to the innovation.

FIG. 5b represents a fixing means for the multipack according to FIG. 5a.

FIG. 6 is a perspective view of the embodiment shown in FIG. 5a.

Figure 3:
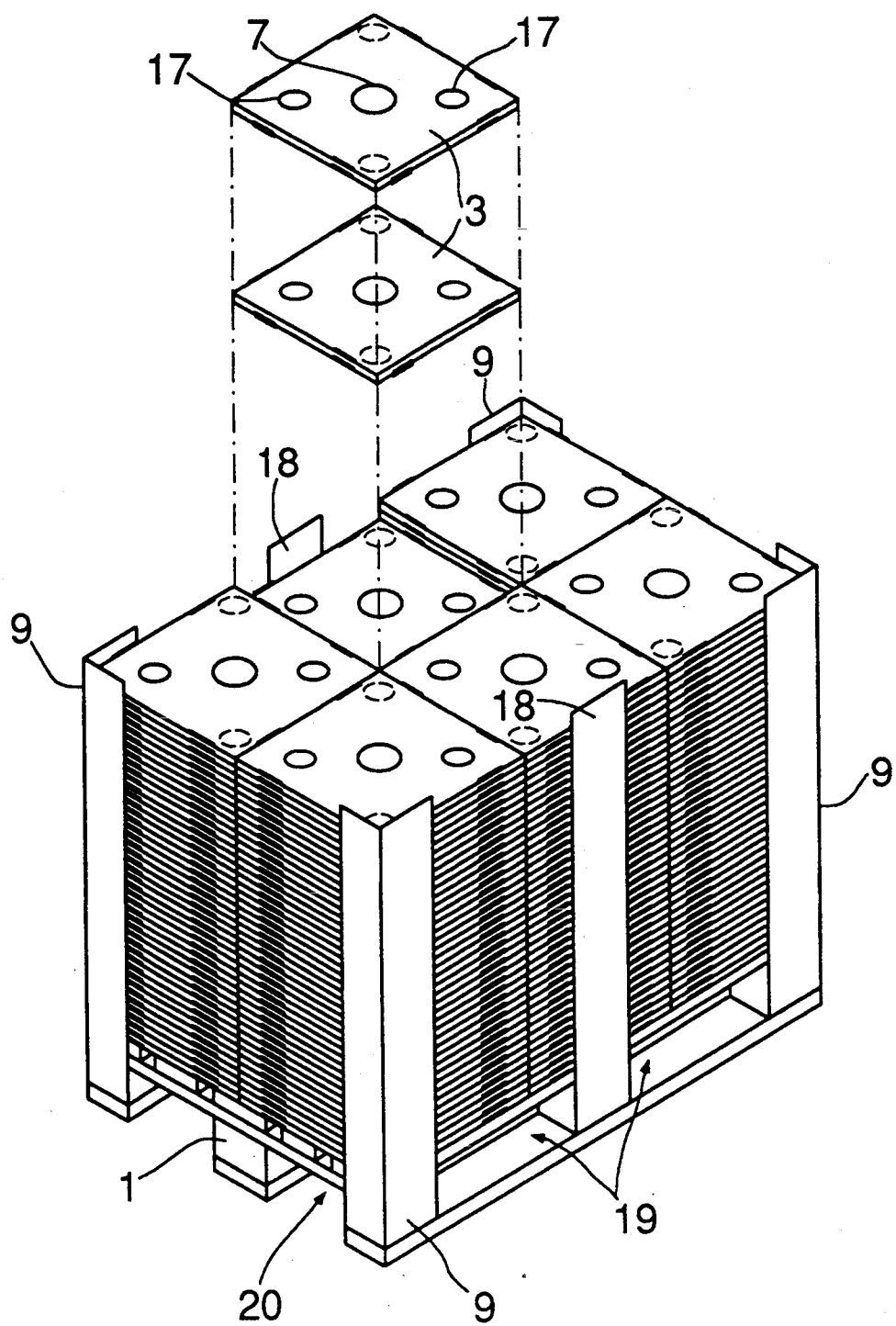
FIG. 3 represents a perspective view of the multipack according to the innovation with intermediate plates stacked one on top of the other.

The basis for the multipack according to the innovation is a pallet (1) consisting of hard plastic which preferably has the size and the construction of the standardized Europallet, as it is known. As FIGS. 1a, 1b and 3 show, the pallet has on the underside the usual engaging openings (19, 20) for raising and transporting by the usual technical means. Placed on the planar surface of the pallet (1) is a rectangular baseplate (2), which preferably consists of relatively soft rubber or similar material. This base forms a substantially non-slip underlying surface for the main pack content.

This comprises a multiplicity of rectangular intermediate plates (3), which are described in still further detail below, and in each case a certain number of wound rolls (5) stacked in between, for example magnetic recording media wound up on flangeless winding hubs. Inserted through the internal bores of the winding hubs is a preferably hollow-cylindrical winding sleeve (6), such as that described, for example, in German Utility Model 92 06 399 of the same applicant. Thus, a number of such pack sets, for example comprising intermediate plates and in each case eight wound rolls of ½" widths stacked one on top of the other, are placed one on top of the other until a certain pack height is reached. To protect the edges of the tape rolls, there may be inserted between the individual wound rolls (5) thin intermediate plastic layers, such as are known from the already described German Utility Model Application 91 09 284.

Figure 1:
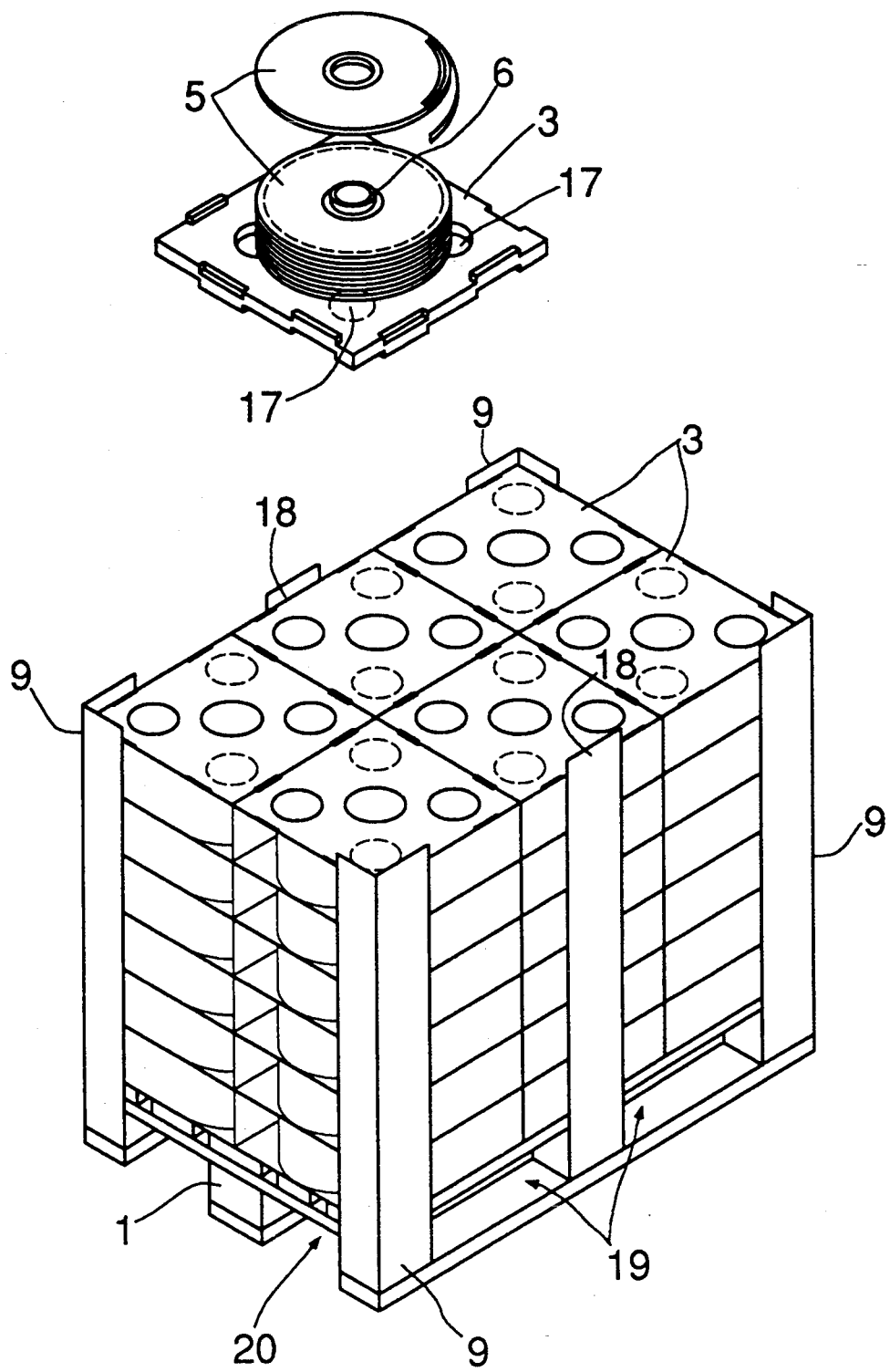
FIGS. 1a and 1b represent side views of the multipack according to the innovation.
FIGS. 1c and 1d represent details of the edge protection.
Figure 1A:
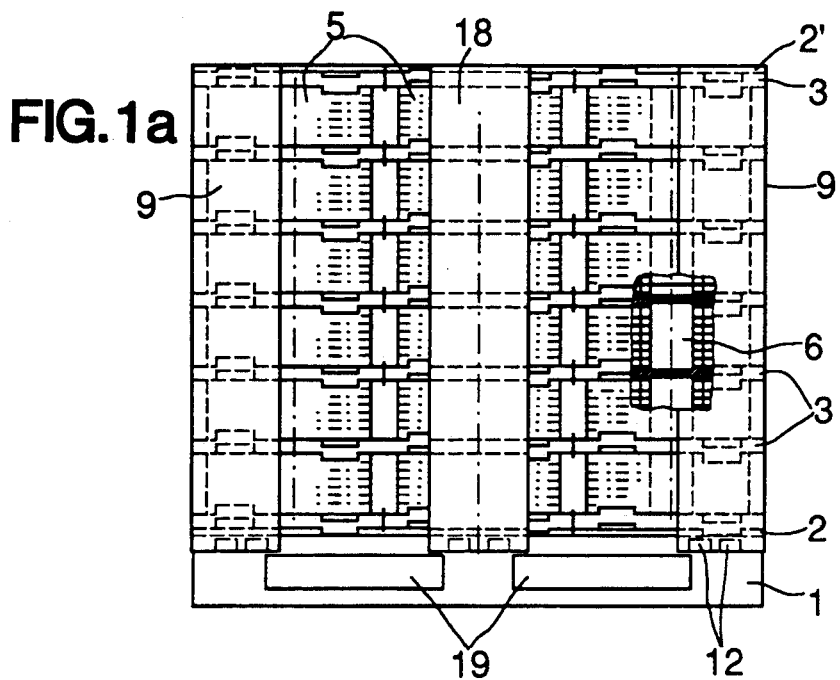
Figures 1B, 1C:
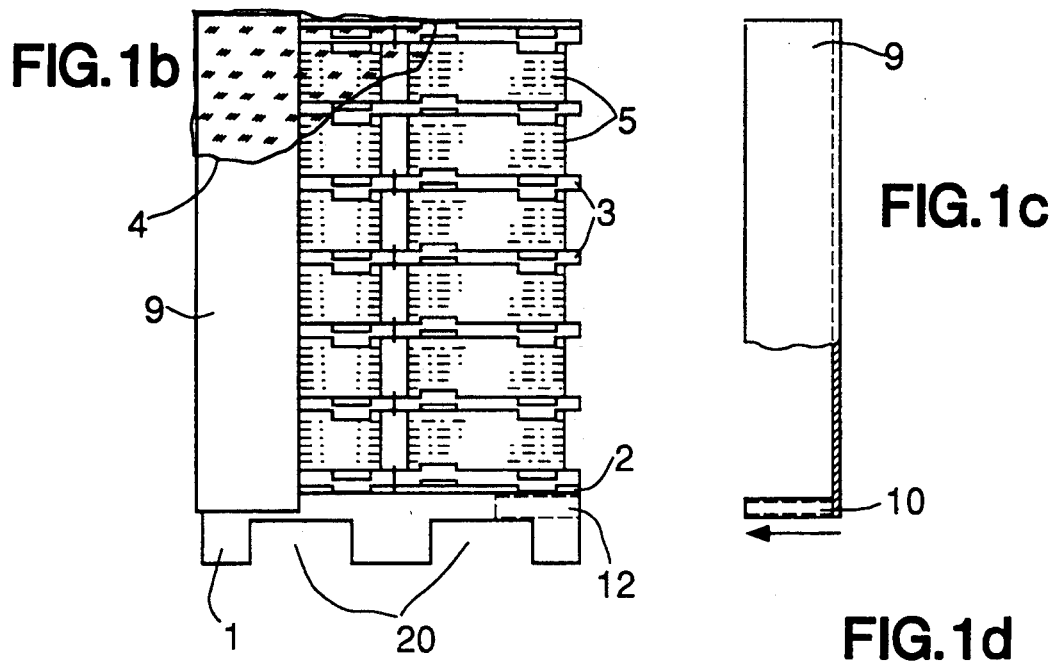

Once the last intermediate plate (3) has been put in place and, as revealed for example by the prospective representation of FIG. 1, a plurality of such pack sets have been placed next to one another in rows on the pallet, a further top plate (2'), identical to the baseplate (2), is placed on the entire unit. Then, right-angled edge protection pieces (9) are laterally attached at the four edges of the multipack, these edge pieces being inserted into corresponding clearances (12) of the pallet (1), as FIGS. 1c and 1d reveal, by means of sheet-metal profiles (10) attached at the bottom. Similarly, sheet-metal strips (18) can be fitted on the pallet in the center of the longitudinal sides by means of the same means as described for the edge protection pieces (9). A stretch film (4), known from the state of the art, is stretched around the multipack, so that the pack content is protected on all sides against dust and damage for transportation.

A major advantage of the multipack according to the innovation is that the wound rolls are protected in a particular way against edge damage by the particular shaping of the intermediate plates and the hub sleeve, which is described below in detail. For this purpose, the intermediate plates (3) have the construction set out below, which is of an identical configuration on both sides and is revealed by FIG. 3, top part, and in particular FIG. 2. Arranged in the center of the intermediate plate is a circular ring groove (7) which, as represented in detail in FIG. 2, may have two stages. The hub sleeve (6) enters this ring groove by its one end face, so that it is fixed undisplaceably on the intermediate plate (3). Then the wound rolls (5) are arranged as described in rows lying one on top of the other on the plate (3) in a set with or without intermediate layers. As soon as a certain height, which is dictated by the length of the hub sleeve (6) is reached, the next intermediate plate is placed on. The height of the hub sleeve is then dimensioned such that the uppermost wound roll is placed with its upper edge slightly away from the intermediate plate (d), whereby the intermediate plate is thus supported merely by the hub sleeve (6). In this way, no pressure bears on the wound rolls, so that it is possible for a plurality of sets of packs constructed in this manner to be stacked one on top of the other without the risk of damage to the wound rolls.

Figures 1D, 2:
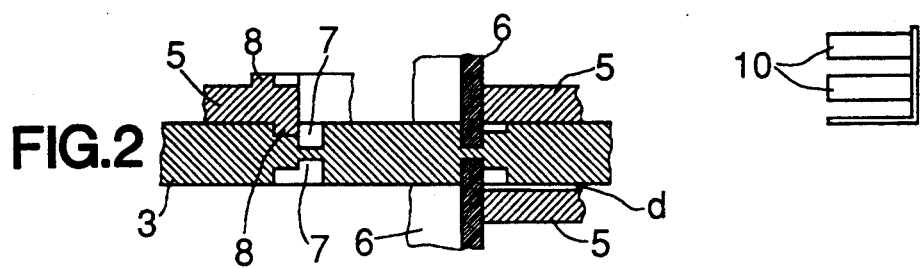
FIG. 2 represents a cutout from FIG. 1a with hub support and intermediate plates.

As the left-hand upper part of FIG. 2 reveals, the two-staged design mentioned above of the ring groove in the intermediate plates also has the purpose of allowing axial projections (8) of the winding hubs (5) to be received by the ring groove (7), so that the wound roll can rest on the intermediate plate.

Alongside the edges, the intermediate plates (3) have gripping hollows (17), in order that the comsiguee can conveniently remove the wound rolls after opening the multipack. The diameters of the covering plates are dimensioned such that, as can be seen from FIG. 1b, they protrude slightly beyond the maximum roll, so that the outer roll is sufficiently protected against damage.

Since, as already described, there is a total of six such sets stacked one on top of the other on a pallet, for example in two rows, it is important that the mutual position of the intermediate plates is established in an adequate way for additional protection of the pack content. For this purpose, as represented in FIG. 4, the intermediate plates have on the edges on one outer side frustoconical lugs (13) opposite which there are on the other side correspondingly shaped grooves (14). If the multipack is then made ready for transportation as already described, the intermediate plates (3) of the adjacently lying sets are arranged in a row one next to the other such that on two adjacently lying intermediate plates the elevations (13) are opposite the grooves (14), so that there is an even larger area of contact of adjacently lying intermediate plates and there is no risk of mutual displacement of two adjacently lying intermediate plates.

It is to be regarded as a further advantage of these edge configurations (compare FIG. 3) that, in return transportation of the multipack from the customer to the manufacturer, the intermediate plates (3) can be stacked one on top of the other such that the elevations in each case engage in the grooves of the intermediate plate lying above. In this way, a multiplicity of intermediate plates stacked one on top of the other can be returned on the pallet described, the construction of the pallet with base and top plates and edge protection being exactly the same moreover for return shipment as for shipment from the manufacturer to the customer (see FIG. 3).

Figure 6:
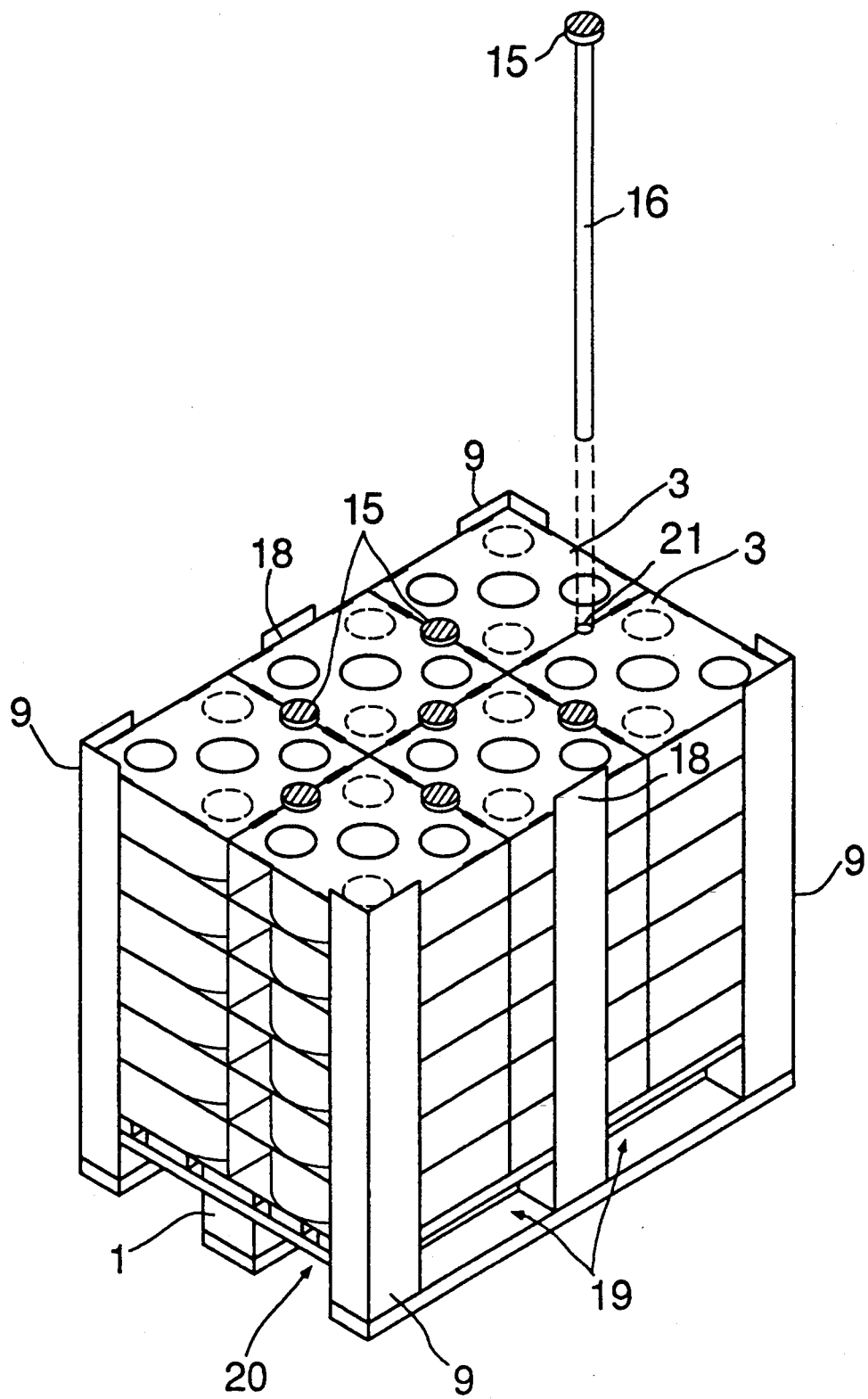

A further embodiment of the mutual fixing of the intermediate plates (3) is also represented in FIGS. 5a, 5b and 6. In this case, these plates have in each case at their edges semi-circular clearances (21), which combine to form a circle when two plates are joined together. A rod (16) with a head (15) is inserted from above through these clearances. This rod prevents the intermediate plates slipping laterally one over the other if subjected to violent jolts during transportation. The head serves at the same time for drawing the rod out when taking the pack apart.

As FIGS. 1 and 3 reveal, up to six wound sets can be shipped one next to the other on a Europalist, depending on the size of the wound rolls. On account of the standard dimensions of the Europalist, in this case the rolls may be of a size of up to 16 inches (40 cm). Like the pallet material, the intermediate plates (3) consist of hard plastic; all pack parts are suitable for a clean room, so that the entire multipack can be taken into a clean room and consequently internal transporting costs at the customer's premises are saved, with the result that the in-house transit times are not increased by the multipack according to the innovation.

With the multipack described above, the objects on which the innovation is based are achieved in their entirety.

We claim:

1. A cuboid multipack for vertically stacked rolls wound on ring-form hubs with internal bores, comprising:
   a rectangular pallet and a rectangular base plate and top plate of corresponding rectangular shape, said base and top plates being of soft plastic material;
   a plurality of packs of said rolls consisting of a multiplicity of rectangular or square-shaped intermediate plates, each plate having two sides and and a length and a width greater than the diameter of any one of said rolls, and a number of stacked said rolls being located between each two of said intermediate plates, and sleeves of hollow cylindrical form having upper and lower ends being inserted into said internal bores of said ring-form hubs of said stacked rolls, said intermediate plates being substantially flat on both their sides except for ring grooves which are provided centrally on both their sides for receiving the upper and lower ends respectively of said sleeves; at least one gripping hollow being positioned at the diameter of said rolls for gripping the periphery of said rolls;
   stacking elements being provided on both sides of said intermediate plates, said stacking elements comprising alternating stacking projections and correspondingly shaped stacking grooves provided for stacking one pack consisting of two intermediate plates and said number of stacked rolls in between onto another pack;
   each of said hollow cylindrical sleeves having a suitable length for penetrating the ring-form hubs of said number of stacked rolls and for engaging said ring grooves on said intermediate plates;
   edge and side protection parts being releasably provided on said pallet which extend over the total height of the multipack including the base plate and top plate; and
   a stretch film drawn around the multipack.

2. A multipack according to claim 1, wherein rods are inserted through corresponding clearances into the edges of the intermediate plates as a means for fixing the intermediate plates.

3. A multipack according to claim 1, wherein said rolls are tape rolls of substantially equal diameters.

4. A cuboid multipack, comprising:
   a rectangular pallet and a base plate, a top plate and a multiplicity of intermediate plates stacked one atop another in one or more stacks, edge and side protection parts releasably provided on said pallet which extend over the total height of the multipack including the base plate and top plate, and a stretch film drawn around the multipack, said base and top plates being rectangular and of soft plastic material, and said intermediate plates being rectangular, each intermediate plate having two sides and being flat on both their sides except for ring grooves which are provided centrally on both their sides for receiving upper and lower ends of hollow cylindrical sleeves, said intermediate plates being provided with stacking elements on both their sides, said stacking elements comprising alternating stacking projections and correspondingly shaped stacking grooves provided for stacking said intermediate plates on top of each other.

* * * * *

UNITED STATES PATENT AND TRADEMARK OFFICE
CERTIFICATE OF CORRECTION

PATENT NO.: 5,450,961

DATED: September 19, 1995

INVENTOR(S): LUTZ et al.

It is certified that error appears in the above-identified patent and that said Letters Patent is hereby corrected as shown below:

On the title page, line 2 under "United States Patent [19]"
"Gottfried et al." should read --Lutz et al.--.

Signed and Sealed this

Sixteenth Day of January, 1996

*Attest:*

BRUCE LEHMAN

*Attesting Officer*     Commissioner of Patents and Trademarks